(12) United States Patent
Darzy

(10) Patent No.: US 6,456,051 B2
(45) Date of Patent: Sep. 24, 2002

(54) VOLTAGE CONVERTER

(75) Inventor: Saul Darzy, Edgware (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 0 days.

(21) Appl. No.: 09/779,777

(22) Filed: Feb. 8, 2001

(30) Foreign Application Priority Data

Feb. 15, 2000 (GB) .............................................. 0003501

(51) Int. Cl.[7] ................................................ G05F 1/40
(52) U.S. Cl. ...................................... 323/284; 323/272
(58) Field of Search ................................ 323/284, 282, 323/281, 285, 286, 272, 222; 363/89, 97, 56

(56) References Cited

U.S. PATENT DOCUMENTS

| | | | | |
|---|---|---|---|---|
| 3,585,491 A | * | 6/1971 | Petersen ...................... | 323/271 |
| 4,017,789 A | | 4/1977 | Morris ......................... | 323/17 |
| 4,128,866 A | | 12/1978 | Doerre ......................... | 363/15 |
| 4,791,544 A | | 12/1988 | Gautherin et al. ............ | 363/49 |
| 4,929,882 A | * | 5/1990 | Szepsi ......................... | 323/222 |
| 5,422,562 A | * | 6/1995 | Mammano et al. .......... | 323/282 |
| 5,969,515 A | * | 10/1999 | Oglesbee ..................... | 323/283 |

OTHER PUBLICATIONS

European Standard Search Report from the British priority Application filed Feb. 15, 2000.

* cited by examiner

*Primary Examiner*—Rajnikant B. Patel
(74) *Attorney, Agent, or Firm*—Wolf, Greenfield & Sacks, P.C.; James H. Morris; Robert A. Skrivanek, Jr.

(57) ABSTRACT

A voltage converter comprises an input, an output and a current control arrangement for controlling the output current of the voltage converter circuit. The current control arrangement comprises a first mode, when the voltage output by the converter circuit is above a threshold voltage, and a second mode in which the voltage output by the circuit is below the threshold voltage. The first and second modes are controlled by the same current control arrangement. The current control arrangement comprises comparing means arranged to receive a reference voltage wherein the reference voltage is a voltage offset associated with at least one of the inputs of the comparing means.

31 Claims, 5 Drawing Sheets

VOLTAGE CONVERTER

The present invention relates to a voltage converter and in particular but not exclusively to DC—DC converters.

DC—DC converters are used to convert an input unregulated DC voltage to regulated or variable DC voltage at the output.

A known step down DC—DC converter 1 is shown in FIG. 1. An input voltage Vin is connected to the source of a PMOS transistor 2. The input voltage is derived from either a rectified alternating current supply or can be supplied directly from a direct current supply. The drain of the PMOS transistor 2 is connected in series to an inductor 8 and to the cathode of a diode 6. The diode 6 is configured as a fly wheel diode and the anode of that diode 6 is connected to ground. The fly wheel diode 6 supplies a current path for the inductor 8 when the PMOS transistor 2 is switched off.

The converter 1 also has a capacitor 10 which is connected in series to the inductor 8. The diode 6 is connected to one end of the inductor 8 with the capacitor 10 connected at the other end of the inductor 8. The capacitor 10 is also connected to ground. The capacitor 10 is in parallel with an output load in the form of a resistor 12. Again, the resistor 12 is also connected to ground. The capacitor in parallel with the output load acts to suppress output current ripples. pulse width modulator 4 is connected to the gate of the PMOS transistor 2. The output of the pulse width modulator 4 determines whether the PMOS transistor 2 is on or off.

The output of the circuit is Vo and is provided by node A which is connected to the resistor 12, the capacitor 10 and the inductor 8.

The output voltage Vo is controlled by varying the amount of time for which the PMOS transistor 2 is switched on. The amount of time for which the PMOS transistor 2 is switched on is controlled by the pulse width modulating circuit 4. The pulse width modulator 4 directly controls the switching of the PMOS transistor 2. The pulse width modulator 4 of FIG. 1 operates with a fixed frequency and variable duty cycle. This means that by controlling the duty cycle of the output of the pulse width modulator, the amount of power delivered to the load 12 is controlled. An increased switching frequency is disadvantageous in that there are higher switching losses and increased interference.

FIG. 2 shows another known DC—DC converter. This circuit is similar to that shown in FIG. 1 and the same components are referenced by the same numerals. However, a feedback path is provided. This feedback path originates from node A and Vfb is fed back to the pulse width modulator 4. There is also a reference voltage Vref supplied to the pulse width modulator. The pulse width modulator 4 compares the voltage Vfb fed back from node A with the reference voltage Vref. Based on the comparison of these two voltages, the duty cycle output by the pulse width modulator 4 is determined.

The pulse width modulator 4 is shown in more detail in FIG. 3. The pulse width modulator 4 has an error signal amplifier 14 which receives the feedback voltage Vfb and the reference voltage Vref. The error amplifier 14 provides an output signal which is the difference between the reference voltage Vref and the feedback voltage Vfb, but amplified.

The output of the error amplifier 14 is connected to the input of a comparator 20. The comparator 20 also receives the output of a saw tooth generator 18. The comparator 20 effectively modulates the output of the saw tooth generator 18 with the error signal from the error amplifier 14. The modulated signal controls the width of the signal applied by the pulse width modulator 4 to the PMOS transistor 2. The modulated signal is output by the comparator 20 to a output buffer 22 which in turn outputs the signal to the gate of the PMOS transistor 2. If the output voltage Vo is to be increased, the width of the signals output by the pulse width modulator will be increased and vice versa.

However, one problem with the arrangement shown in FIG. 2 is that there is no control on the output current under normal and short circuit operation. The behavior of the pulse width modulator 4 is therefore unpredictable. Clearly this is disadvantageous. Relatively large unwanted currents may flow through the converter. This is again undesirable.

It is therefore an aim of embodiments of the present invention to address this problem.

According to one aspect of the present invention there is provided a voltage converter circuit comprising an input; an output; a current control arrangement for controlling the output current of said circuit, said current control arrangement comprising a first mode when the voltage output by said converter circuit is above a threshold voltage and a second mode in which the voltage output by said circuit is below said threshold voltage, said first and second modes being controlled by the same current control arrangement.

For a better understanding of the present invention and as to how the same may be carried into effect, reference will now be made by way of example only to the accompanying drawings in which.

Figure 4:
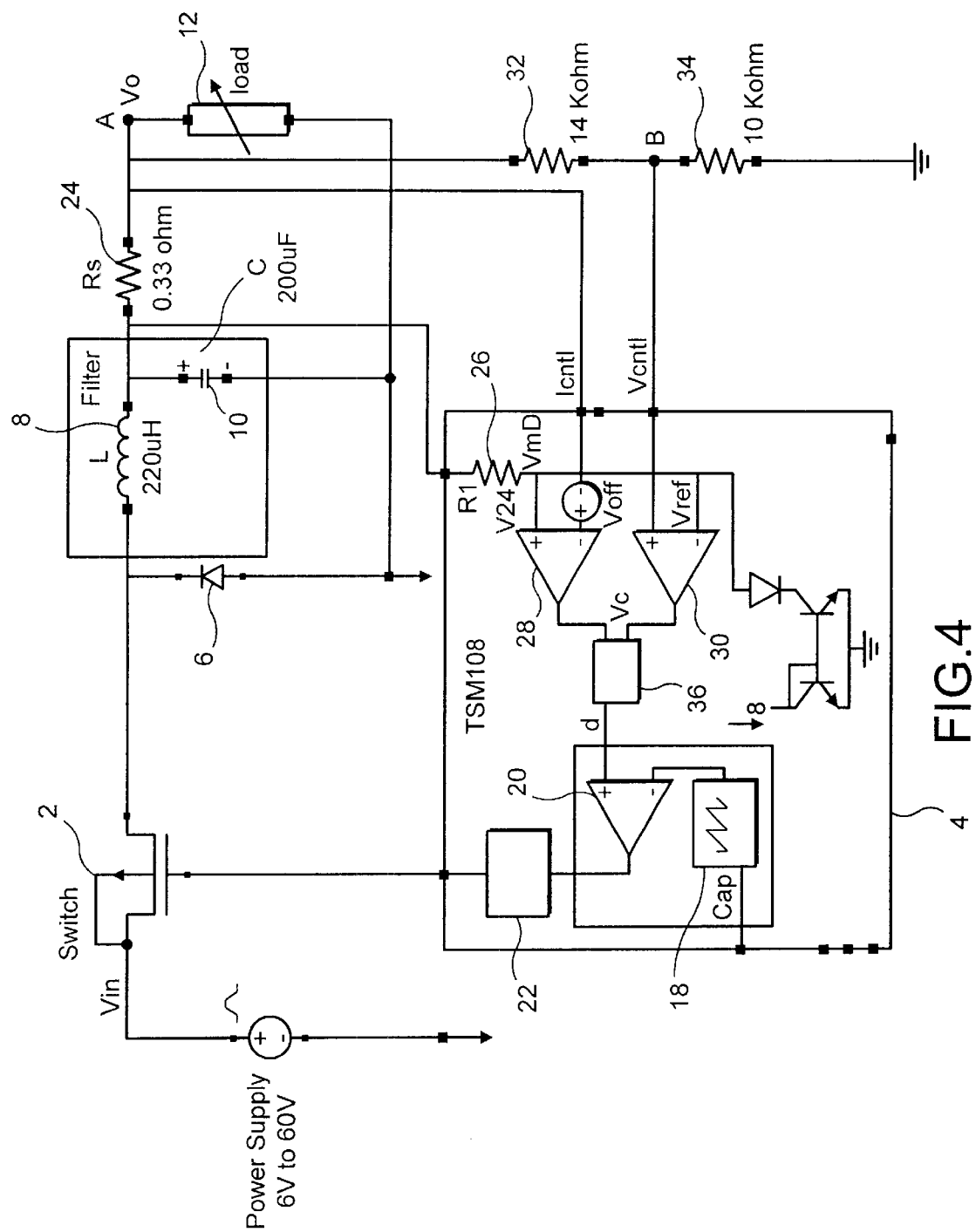
FIG. 4 shows a DC—DC converter embodying the present invention.

Reference will now be made to FIG. 4 which shows an embodiment of the invention. Those parts which are the same as in the previously described arrangements will be referred to with the same reference numbers. Embodiments of the present invention incorporate the control of the output current during normal operation and when there is a low output voltage (including short circuit conditions) in the same control loop.

The DC—DC converter of FIG. 4 has two control loops. The first control loop is a voltage control loop and the second control loop is a current control loop. The voltage control loop may be similar to that used in a conventional DC—DC converter. The current control loop controls the current under different values of output voltage including when there is a short circuit. The pulse width modulator 4 is controlled either by the signal from the current loop or by the signal from the voltage loop. This will depend on circuit conditions, as will be discussed in more detail hereinafter.

Figure 1:
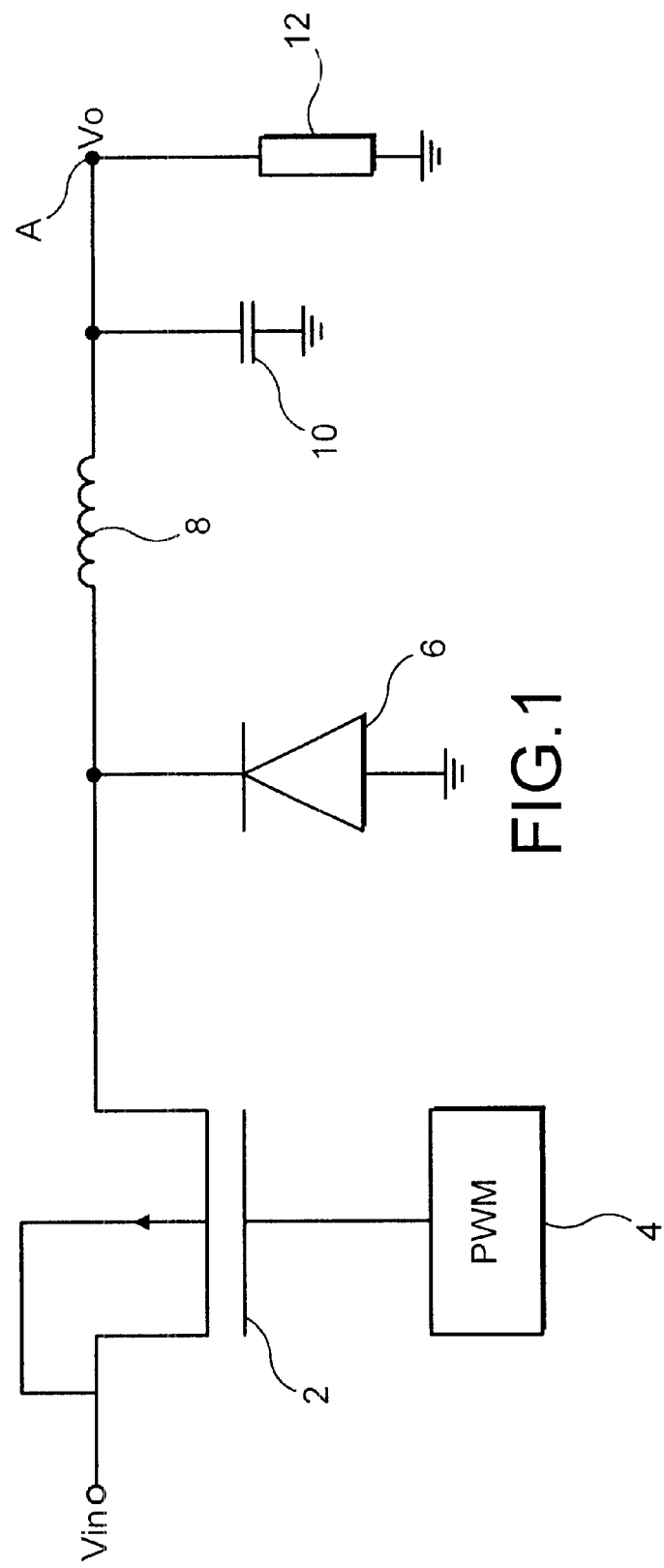
FIG. 1 shows a first DC—DC converter.
Figure 2:
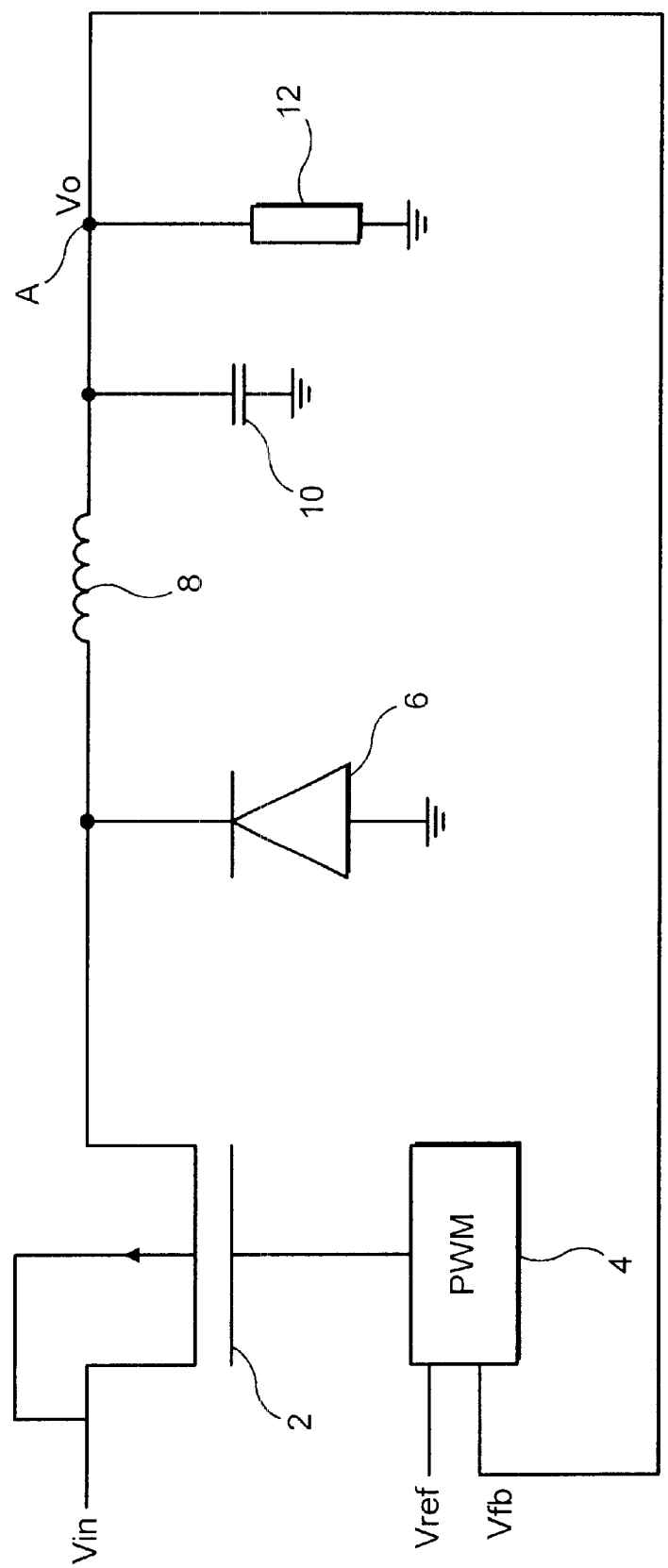
FIG. 2 shows a second DC—DC converter.
Figure 3:
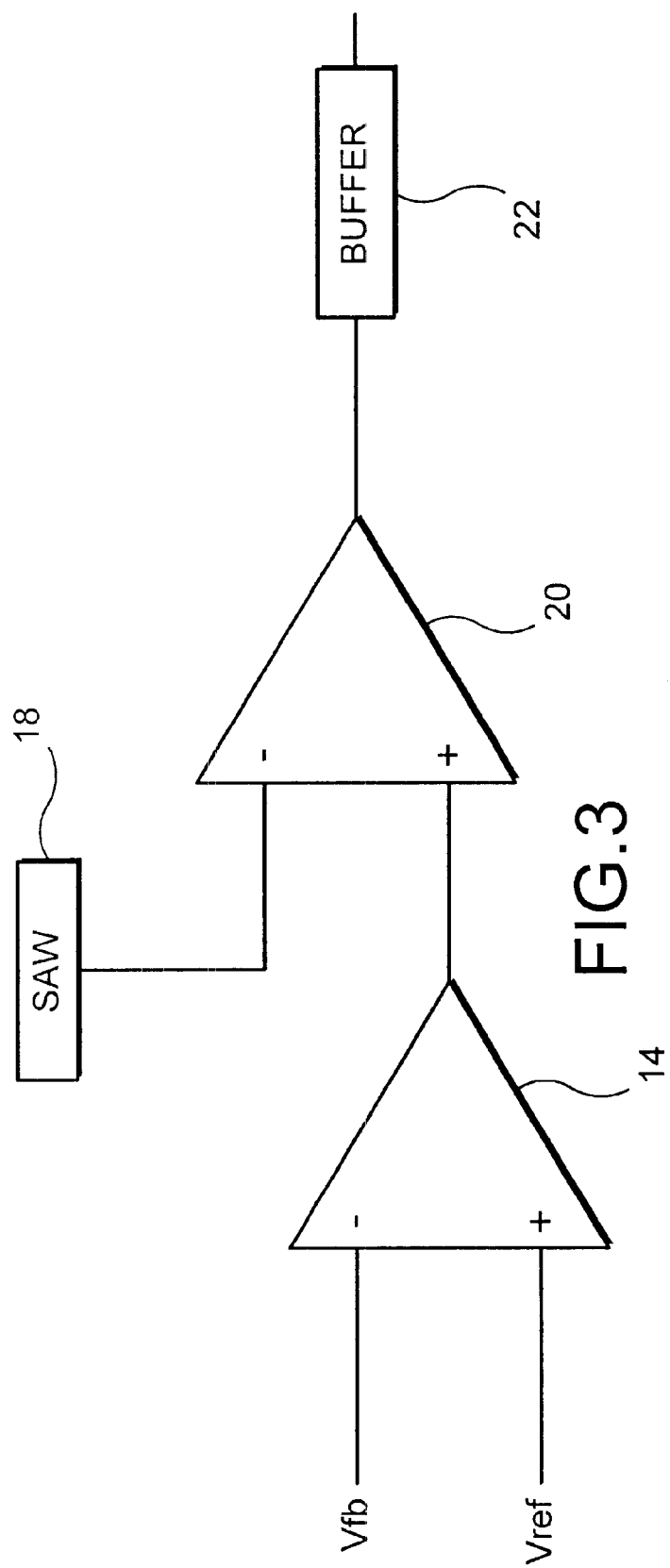
FIG. 3 shows the pulse width modulator of FIG. 2 in more detail.

The DC—DC converter has a PMOS transistor 2 connected to the input voltage Vin. As in the arrangement of FIG. 1, the PMOS 2 transistor is controlled by a pulse width modulator 4. The PMOS transistor 2 is connected to a diode 6 and an inductor 8, as in FIG. 1. The inductor 8 is connected in series with the capacitor 10 and the load resistor 12. However, in embodiments of the present invention a sense resistor 24 is connected between the inductor 8 and the output node A. Accordingly, one end of the sense resistor 24 is connected to the capacitor 10 and the inductor 8 whilst the other end of the sense resistor 24 is connected to the load resistor 12.

A first voltage loop resistor 32 and a second voltage loop resistor 34 are connected in series between node A and ground.

The pulse width modulator 4 has two input comparators 28 and 30. The first input comparator 28 has a first input connected to an internal resistor 26. This is an internal resistor or can be an external resister. This resistor 26 is connected, at its other end, to the input side of the sense resistor 24, that is to a node between the inductor 8 and the sense resistor 24. The second input of the first comparator 28 is connected to the output of the sense resistor 24, that is to node A. Due to the construction of the comparator 28, the input to the comparator 28 incorporates a voltage offset.

The first comparator 28 is arranged to sense the difference between the internally generated reference voltage across the internal resistor 26 and the voltage drop across the sense resistor 24.

The output of the first comparator is input to an OR circuit 36.

The second comparator 30 receives a first input from node B which is between the first and second voltage loop resistors 32 and 34. The second input to the comparator 30 is provided by a reference voltage Vref. The output of the second comparator 30 is also input to the OR circuit 36.

The OR circuit selects the output of one of the first and second comparators. In particular, the OR circuit selects the higher value and provides that higher value as an output value. The OR circuit provides an analogue output.

The output of the OR circuit 36 is input to a third comparator 20. This comparator 20 also receives the output of a saw tooth generator 18. Using the output from the OR circuit 36 and the output from the saw tooth generator 18, the third comparator 20 generates a modulated output which is used to control the PMOS transistor 2. The output of the comparator 20 is input to an output buffer 22. The output of the buffer 22 controls the PMOS transistor, and in particular if it is on or off.

As can be seen from FIG. 4, the voltage control loop and the current sensing loop are independent. The voltage control loop uses the second comparator 30 and the first and second voltage loop resistors 32 and 34. The current control loop uses the first comparator 28 and the sense resistor 24. In particular, the sense resistor 24 of the current control loop does not effect the accuracy of the voltage control loop. This is because the sense resistor 24 is not provided between the load resistor 12 and ground.

When the arrangement of FIG. 4 is controlled by the current control loop, the first comparator 28 senses the difference between the internally generated reference voltage across the internal resistor 26 and the voltage drop across the sense resistor 24. The compensated output signal from the comparator 28 is output by the OR circuit 36 and compared with a saw tooth signal generated by the saw tooth oscillator 18 to get a pulse width modulated signal. This signal is used to drive the output buffer 22 which in turn provides the required driving voltage and current for the PMOS switch 2.

The circuit is designed so that the current control loop is used where there is a short circuit current or the likelihood of a short circuit current. In the embodiment shown, if the output voltage Vo is less than 1 volt, the pulse width will be controlled by the current loop. The OR circuit 36 selects the larger of the two outputs from the two comparators. When the output voltage Vo is less than 1 volt, the first voltage input to the second comparator 30 is so low that the transistors of the comparator is not switched on. The first and second voltage loop resistors are of a size such that the voltage provided to the first input of the second comparator is as good as zero. The output of the second comparator is therefore zero and the OR circuit 36 selects the output of the first comparator 28 which will be the larger of the two.

In the case of a short circuit current, the reference voltage input to the first input of the first comparator will be zero. In other words, the voltage across the internal resistor 26 is zero. Accordingly, the only signal at the input of the first comparator 28 is the voltage across the sense resistor 24. Because of the inherent voltage offset of the comparator, the output of the comparator will go low (but not to zero) as long as the output current at node A is less than the value defined by the voltage offset of the second input divided by the value of the sense resistor 24. The PMOS transistor 2 will be on for a maximum of 95% of the time period until the output current reaches the value of the offset voltage divided by the resistance of the sense resistor 24, then the pulse width will be controlled by the current loop to keep the current at that level.

When the output voltage Vo increases above 1 volt, the sense voltage, that is the voltage across the internal resistor 26 will have its nominal value and the current loop will provide the required control signal level to set the pulse width at the proper value to fix the output current at its predefined value, that is the sense voltage divided by the resistance of the sense resistor 24.

Figure 5:
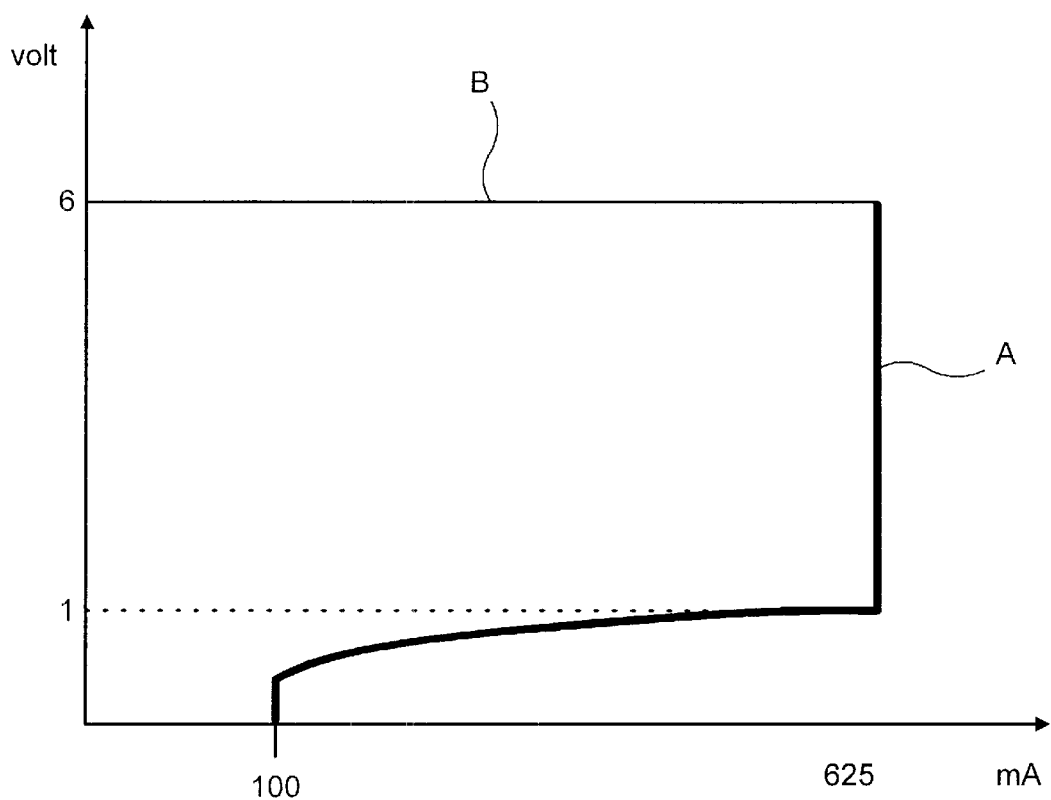
FIG. 5 shows a graph of a voltage/current curve.

Reference is made to FIG. 5 which shows a graph of output voltage Vo against output current. Line A represents the circuit controlled by the current loop and line B represents the circuit controlled by the voltage loop. The voltage is initially 6 Volts as represented by line B. The circuit is thus under the control of the voltage loop. As the output voltage drops below the maximum voltage, that is 6V, the current loop then takes control of the circuit. Thus the current loop will control the circuit when the output voltage is less than 6V. The current loop keeps the output current at the maximum predefined output value if the output voltage is between 1 and 6 V. When the output voltage is less than or equal to 1 voltage, the current loop controls the output current such that it reduces the current value to the offset voltage divided the sense resistor resistance, which in the example shown is 100 mA, when the output voltage is zero.

Typical values of the resistors are as follows:

Sense resistor—0.33 Ohms

First voltage loop resistor—14K Ohms

Second voltage loop resistor—10K Ohms

A fine adjustment of the output current can easily be achieved by adding a resistor in series with the internal resistor 26.

The first comparator 28 is a rail to rail amplifier which is why an output can be provided by the comparator even when the first input to that comparator is zero.

The main features of that amplifier 28 is that it is a rail to rail transconductance amplifier with a systematic (inherent) offset voltage. The amplifier is arranged to work when the common mode input voltage is zero (that is under short circuit condition) and in that region it has an offset voltage equal to the value of the required short circuit current x the resistance of the sense resister. It is also a current output amplifier to meet the requirement for a simple compensation network, that is the compensation network is an RC circuit connected at each output of the amplifier to ground.

What is claimed is:

1. A voltage converter circuit comprising:
   an input;
   an output; and
   a current control arrangement for controlling an output current of said converter circuit, said current control arrangement comprising a first mode when a voltage output by said converter circuit is above a threshold voltage and the output current of said converter circuit is substantially constant and a second mode in which the voltage output by said converter circuit is below said threshold voltage, said first and second modes being controlled by the same current control arrangement, said current control arrangement comprising comparing means, arranged to receive a reference voltage, comprising a voltage offset associated with at least one of a plurality of inputs of the comparing means; whereby when the voltage output by said converter circuit is in a short circuit condition, the comparing means provides a predetermined non zero output.

2. A circuit as claimed in claim 1, wherein said second mode is used when the output voltage is between said threshold voltage and a short circuit condition.

3. A circuit as claimed in claim 1, wherein said current control arrangement is arranged to control said converter circuit in said second mode such that the output current is kept at or below a given threshold when the output voltage is in the short circuit condition.

4. A circuit as claimed in claim 1, wherein said current control arrangement further comprises a resistive element.

5. A circuit as claimed in claim 4, wherein said current control arrangement is arranged to determine a voltage drop across said resistive element.

6. A circuit as claimed in claim 1, wherein said comparing means comprises a differential amplifying arrangement.

7. A circuit as claimed in claim 5, wherein said comparing means is arranged to compare said reference voltage with the voltage drop across said resistive element.

8. A circuit as claimed in claim 7, wherein in said first mode, the voltage drop across the resistive element plus a voltage drop across a second resistive element connected to one of the plurality of inputs of said comparing means is compared to said reference voltage.

9. A circuit as claimed in claim 1, wherein said comparing means comprises a rail to rail amplifier.

10. A circuit as claimed in claim 1, wherein said comparing means comprises a transconductance amplifier.

11. A circuit as claimed in claim 4, wherein said comparing means is such that in the short circuit condition, the output current is equal to the voltage offset divided by a resistance of said resistive element.

12. A circuit as claimed in claim 1, wherein an output of said current control arrangement is used to generate a control signal for controlling said converter circuit.

13. A circuit as claimed in claim 12, wherein said control signal is used to control a switch.

14. A circuit as claimed in claim 12, wherein the output of the current control arrangement is used to modulate a signal to generate the control signal.

15. A circuit as claimed in claim 1, wherein said converter circuit is a DC to DC converter circuit.

16. A circuit as claimed in claim 1, wherein a voltage control arrangement is provided.

17. A circuit as claimed in claim 16, wherein said current control arrangement and said voltage control arrangement are independent.

18. A circuit as claimed in claim 16, wherein selecting means are provided for selecting one of said voltage control arrangement and said current control arrangement.

19. A circuit as claimed in claim 18, wherein said selecting means comprises an OR circuit.

20. A circuit as claimed in claim 18, wherein said selecting means compares outputs from said voltage control arrangement and said current control arrangement in order to select which of said control arrangement is to control said converter circuit.

21. A voltage converter to provide an output voltage to a load, the voltage converter comprising:

an input adapted to receive an input voltage;

an output to provide the output voltage to the load;

a voltage control loop, connected to the output, to control a value of the output voltage provided to the load; and a current control loop, connected to the output, to control a value of a current provided to the load, the current control loop having a first mode in which the value of the output voltage is above a threshold value and the value of the current provided to the load has a first and substantially constant value, and a second mode in which the value of the output voltage is at or below the threshold value and the value of the current provided to the load varies between the first value and a second and non-zero value that is below the first value, wherein when the value of the output voltage is below the threshold value and a short circuit condition exists, the value of the current provided to the load is limited to the second value.

22. The voltage converter of claim 21, wherein the current control loop operates independently of the voltage control loop.

23. The voltage converter of claim 21, wherein the voltage converter is a pulse width modulated voltage converter.

24. The voltage converter of claim 21, further comprising:

a transistor having a fist main terminal coupled to the input of the voltage converter, a second main terminal, and a control terminal;

an inductor having a first terminal that is coupled to the second main terminal of the transistor and a second terminal;

a first resistor coupled to the second terminal of the inductor and the output of the voltage converter; and a capacitor coupled between the second terminal of the inductor and in parallel with the load;

wherein the current control loop includes a comparator having a first input that is coupled through a second resistor to the second terminal of the inductor and a second input that is coupled through a voltage offset to the output of the voltage converter, an output of the comparator being coupled to the control terminal of the transistor, the comparator comparing a first voltage drop across the first resistor to a second voltage drop across the second resistor to provide a control signal that controls the value of the current provided to the load in the second mode, wherein when the first voltage drop is greater that the second voltage drop and the short circuit condition exists, the control signal limits the value of the current provided to the load to the second value.

25. The voltage converter of claim 24, wherein the second value of the current provided to the load is limited to a value of the voltage offset divided by a resistance of the first resistor.

26. The voltage converter of claim 25, wherein when the second drop is greater than the first voltage drop and the value of the output voltage is above the threshold value, the control signal fixed the value of the current provided to the load in the first mode of the first value.

27. The voltage converter of claim 26, wherein the first value of the current provided to the load is approximately equal to a value of the first voltage drop divided by the resistance of the first resistor.

28. The voltage converter of claim 24, wherein the comparator is a first comparator and the control signal is a first control signal, and wherein the voltage control loop includes:
- a voltage divider coupled to the output converter, the voltage divider having an output;
- a second comparator having a first input that is coupled to the output of the voltage divider and a second input that is coupled to a reference voltage, an output of the second comparator being coupled to the control terminal of the transistor, the second comparator comparing the output of the voltage divider to the reference voltage to provide a second control signal that regulates the value of the voltage provided to the load.

29. The voltage converter of claim 28, further comprising:
- an OR circuit, coupled to the output of the first and second comparators, the OR circuit selecting one of the first and second control signals to provide as an output of the OR circuit based upon which of the first and second control signals is larger; and
- a third comparator having a first input coupled to the output of the OR circuit and a second input that is coupled to an output of a saw tooth generator, an output of the third comparator being coupled to the control terminal of the transistor to provide a modulated output signal that controls the transistor.

30. The voltage converter of claim 24, wherein when the second voltage drop is greater that the first voltage drop and the value of the output voltage is above the threshold value, the control signal fixes the value of the current provided to the load in the first mode to the first value.

31. The voltage converter of claim 24, wherein the first value of the current provided to the load is approximately equal to a value of the first voltage drop divided by the resistance of the first resistor.

* * * * *